United States Patent [19]
Eastwood et al.

[11] 3,899,407
[45] Aug. 12, 1975

[54] METHOD OF PRODUCING THIN FILM DEVICES OF DOPED VANADIUM OXIDE MATERIAL

[75] Inventors: H. Keith Eastwood, Beaconsfield; Barry A. Noval, Cote St. Luc, both of Canada

[73] Assignee: Multi-State Devices Ltd., Quebec, Canada

[22] Filed: Aug. 1, 1973

[21] Appl. No.: 384,505

[52] U.S. Cl. .................................................. 204/192
[51] Int. Cl. .............................................. C23c 15/00
[58] Field of Search ....................................... 204/192

[56] References Cited

UNITED STATES PATENTS

| | | | |
|---|---|---|---|
| 3,402,131 | 9/1968 | Futaki et al. | 252/512 |
| 3,483,110 | 12/1969 | Rozgonyi | 204/192 |
| 3,647,664 | 3/1972 | Fleming et al. | 204/192 |
| 3,660,155 | 5/1972 | Mackenzie | 204/192 |
| 3,751,310 | 8/1973 | Cho | 204/192 |
| 3,765,940 | 10/1973 | Hentzschel | 204/192 |

*Primary Examiner*—Oscar R. Vertiz
*Assistant Examiner*—Wayne A. Langel
*Attorney, Agent, or Firm*—Spencer & Kaye

[57] ABSTRACT

A method of producing thin film devices of vanadium oxide material consists in reactively sputtering onto a suitable substrate thin films made of a major amount of a vanadium oxide material having a transition temperature of fixed value and a minor amount of a doping material permitting the raising or lowering of the transition temperature of the thin film device respectively above or below such fixed value. The doping material may be selected from the group consisting of tungsten, molybdenum, titanium, niobium, germanium, silicon and carbon.

7 Claims, 1 Drawing Figure

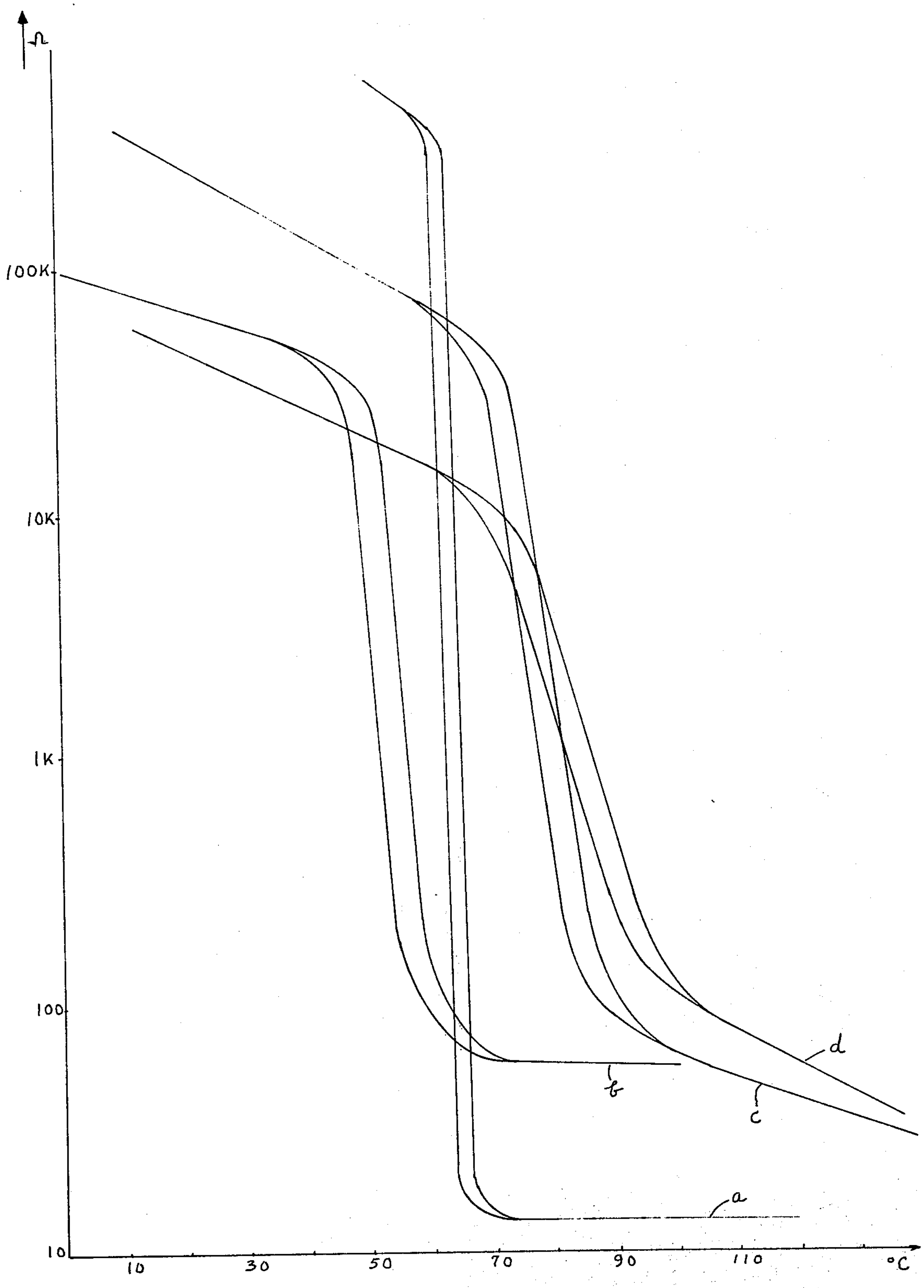
Ω
100K
10K
1K
100
10
10
30
50
70
90
110
°C
a
b
c
d

METHOD OF PRODUCING THIN FILM DEVICES OF DOPED VANADIUM OXIDE MATERIAL

This invention relates to a method of producing thin film devices of doped vanadium oxide material having a desired transition temperature.

BACKGROUND OF THE INVENTION

Various methods of producing temperature sensitive resistors based on vanadium oxide materials doped with various compounds have been disclosed in the prior art. The purpose of adding doping compounds to a vanadium oxide is to alter its resistance-temperature characteristic, specifically to raise or lower its transition temperature and to modify the sharpness of the abrupt resistance change at the transition temperature.

The methods disclosed in the prior art involve sintering and reacting mixtures of metal oxides in order to produce a compact mass in which there is a substantial fraction of vanadium oxide material. Electrical contacts are made by imbedding metallic wires in this mass. The limitations of these techniques are as follows:

a. Difficulty of reproducing the exact electric resistance.

b. Difficulty of reproducing the exact resistance-temperature characteristic curve.

c. Additional compounds are often required to produce mechanically strong devices with the desired electrical characteristics. These additional materials can contribute to long term instability of the devices.

d. These techniques are not readily adapted to miniaturization for integrated circuit applications.

SUMMARY OF THE INVENTION

The above drawbacks are substantially overcome by using the method in accordance with the present invention which consists in reactively sputtering, onto a suitable substrate, thin films made of major amounts of vanadium oxide material having a transition temperature of fixed value and of minor amounts of a doping material permitting the raising or lowering of the transition temperature of the thin film device respectively above or below such fixed value. The doping material may be selected from the group consisting of tungsten, molybdenum, titanium, niobium, germanium, silicon and carbon.

The atomic percent of the doping material normally varies from 0.05 to 10% depending on the material used. Reactive sputtering from a composite target comprising 0.1 to 6 atomic percent germanium the balance being vanadium has been used to produce films doped with germanium in order to raise the transition temperature. Similarly, a target comprising 0.1 to 1 atomic percent tungsten has been used to produce films doped with tungsten in order to lower the transition temperature.

The composite target may be an alloy of the desired materials produced by standard metallurgical techniques, a sintered metal target produced by powder metallurgy techniques or simply a vanadium metal target to which pieces of doping metal are fastened in a convenient way. In any case, the dopant element is sputtered along with vanadium and incorporated in the growing vanadium oxide film.

DESCRIPTION OF THE DRAWINGS

The invention will now be disclosed with reference to the FIGURE which shows various resistance-temperature characteristics of thin film devices of doped vanadium dioxide formed in accordance with the present reactive sputtering method.

DETAILED DESCRIPTION OF THE INVENTION

In the drawings, curve *a* illustrates the resistance-temperature characteristic of pure vanadium dioxide. It will be noted that its transition temperature is about 65°C. Curve *b* shows the resistance-temperature characteristic of vanadium dioxide doped with 0.35% (atomic) tungsten. The transition temperature has been lowered to about 52°C. Curve *c* shows the resistance-temperature characteristic of vanadium dioxide doped with 4% (atomic) germanium. Here, the transition temperature has been raised to about 80°C. Curve *d* shows the resistance-temperature characteristic of vanadium dioxide doped with 5% (atomic) germanium. The transition temperature is raised to about 85°C.

Reactive sputtering from a composite target has permitted the preparation of films of vanadium dioxide, incorporating doping compounds, having transition temperature ranging from 50° to 90°C. These films are sputtered from a composite metal target in an oxidizing atmosphere using a conventional reactive sputtering technique. In accordance with such technique, vanadium and oxygen vapors are allowed to condense and react on a heated substrate under conditions adjusted to ensure the growth of vanadium dioxide crystals. A suitable sputtering technique has been disclosed in detail in an article entitled "Transport and Structure Properties of $VO_2$ Films" published by Clarence C. Y. Kwan et al., in Applied Physics Letters, Vol. 20, No. 2, 15 January 1972. Of course, other sputtering techniques could be used. In the present case, in order to incorporate the doping material, a composite target is used which includes the desired proportion of the doping element. As mentioned previously, the composite target may be an alloy of the desired materials, a sintered metal target composed of powders of the desired metals, or a vanadium metal target to which pieces of doping metal are fastened.

By using thin film metallization and definitition techniques known to those versed in the art, it is convenient to use these films to make arrays of small identical temperature sensors. These sensor devices may be provided with thin film platinum contacts as disclosed in U.S. patent application No. 335,651 filed Feb. 26, 1973 and assigned to the same interest as the present application. The active area between contacts can be varied to achieve the desired impedance levels but it is typically 0.010 inch × 0.010 inch. The sensor devices are deposited on single crystal sapphire substrates which favors the formation of large grain vanadium dioxide films.

Devices produced by these techniques can be very small so that the physical mass is also very small depending primarily on the packaging required to attach leads and give physical protection. Such devices can be produced in metal packages with glass seals which respond very rapidly to ambient temperature changes. Thus, such devices with a range of transition temperatures can be used for rapid detection of temperature change and for accurate temperature regulation of small masses.

Thermal relays including a heater for heating vanadium dioxide films may also be made by this technique. The sputtering technique in accordance with the invention will permit to design thermal relays using vanadium dioxide material operating at any temperature within the range of 50° to 90°C.

Although the characteristic curves illustrated in the FIGURE are those obtained with doped vanadium dioxide having a transition temperature of about 65°C, it is to be understood that other vanadium oxides having different transition temperatures could equally be doped by the sputtering technique in accordance with the invention to raise or lower their transition temperature.

We claim:

1. A method of producing thin film devices of vanadium oxide material having a desired transition temperature, consisting in reactively sputtering onto a suitable substrate a thin film consisting essentially of a vanadium oxide material having a transition temperature of fixed value and from 0.05 to 10 atomic percent of a single doping material selected from the group consisting of tungsten, molybdenum, titanium, niobium, germanium, silicon and carbon, permitting the increase or decrease in the transition temperature respectively above or below said fixed value.

2. A method as defined in claim 1, wherein the vanadium oxide material is vanadium dioxide and wherein the doping material is germanium of an atomic percent varying from 0.1 to 6, permitting to raise the transition temperature of vanadium dioxide from about 65°C up to about 85°C.

3. A method as defined in claim 1, wherein the vanadium oxide material is vanadium dioxide and wherein the doping material is tungsten in an amount varying from 0.1 to 1 atomic percent, permitting to lower the transition temperature of vanadium dioxide from about 65°C down to about 55°C.

4. A method as defined in claim 1, wherein reactive sputtering is done from a composite target made of an alloy of vanadium and a single one of said doping materials.

5. A method as defined in claim 1, wherein reactive sputtering is done from a composite sintered metal target made of powders of vanadium and a single one of said doping materials.

6. A method as defined in claim 1, wherein reactive sputtering is done from a composite target made of vanadium metal to which pieces of a single one of said doping materials is attached.

7. A method as defined in claim 1 wherein said step of reactively sputtering includes simultaneously sputtering vanadium and a single one of said doping materials onto a heated substrate in an oxidizing atmosphere.

* * * * *